United States Patent
Naoi et al.

(10) Patent No.: US 6,277,518 B1
(45) Date of Patent: *Aug. 21, 2001

(54) ELECTRODE MATERIALS FOR USE IN BATTERIES, AND ELECTRODES AND BATTERIES USING SAME

(75) Inventors: Katsuhiko Naoi; Shunzou Suematsu; Ari Manago; Junko Kurihara; Toshihiko Nishiyama; Gaku Harada; Shinako Okada; Koji Sakata, all of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/210,999

(22) Filed: Dec. 15, 1998

(30) Foreign Application Priority Data

Dec. 17, 1997 (JP) .................................... 9-347913

(51) Int. Cl.$^7$ .................................... H01M 4/60
(52) U.S. Cl. .................................... 429/212; 429/213
(58) Field of Search .................................... 429/212, 213

(56) References Cited

U.S. PATENT DOCUMENTS 5,731,105  3/1998  Fleischer et al. .................... 429/192

FOREIGN PATENT DOCUMENTS

| 0 872 903 | * 10/1998 | (EP) . |
| 61-200669 | 9/1986 | (JP) . |
| 4-147511 | 5/1992 | (JP) . |
| 6-56989 | 3/1994 | (JP) . |
| 10-106579 | 4/1998 | (JP) . |
| 10-154512 | 6/1998 | (JP) . |
| 10-289617 | 10/1998 | (JP) . |

OTHER PUBLICATIONS

D. MacInnes et al., "Organic Batteries: Reversible n– and p–Type Electrochemical Doping of Polyacetylene, (CH)x", J. Chem. Soc. Chem. Commun., (1981), pp. 317–319.

E.S. Matveeva, "Could the acid doping of polyaniline represents the charge transfer interaction", Synthetic Metal s 83, (1996), pp. 89–96.

V.K. Gater et al., "Quinone molecular films derived from aminoquinones", J. Electroanal. Chem., vol. 257, 1988, pp. 133–146.

V.K. Gater et al., "Quinone Molecular Films Derived From 1,5–Diaminoanthra–quinone" J. Electroanal. Chem., vol. 235, 1987, pp. 381–385.

L. Roullier et al., "Electrodes Modified by a Thick Deposit of an Organic Compound", Journal of Electrochemical Society, vol. 132, No. 5, 1985, pp. 1121–1125.

S. Moteki et al., "Synthetic and electrochemical studies of anthraquinone–substituted poly(pyrrole) films", Journal of Electroanalytical Chemistry, vol. 447, 1998, pp. 91–95.

M.S. Hossain et al., "The Electrochemistry of Graphite and Modified Graphite Surfaces: The Reduction of $O_2$", Electrochimica Acta, vol. 34, No. 12, 1989, pp. 1733–1737.

M. Fujihara et al., "Photo–assisted Electrochemical Oxidation of Isopropanol to Acetone Sensitized by Photoexcited Anthraquinone Derivatives Chemically Bound on a Carbon Electrode", J. Electroanal. Chem., vol. 137, 1982, pp. 163–170.

* cited by examiner

Primary Examiner—Laura Weiner
(74) Attorney, Agent, or Firm—Sughrue, Mion, Zinn, Macpeak & Seas, PLLC

(57) ABSTRACT

A polymer composed of structural units having a fused ring structure derived from a nitrogen-containing cyclic compound and a quinone compound as represented by the following formula is used as an electrode material for use in batteries. This makes it possible to provide batteries having excellent cycle characteristics and a high power density.

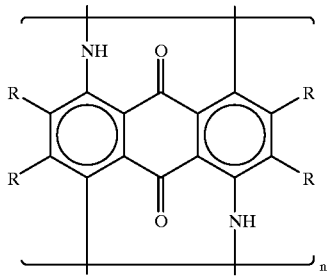

(1)

11 Claims, 1 Drawing Sheet

ELECTRODE MATERIALS FOR USE IN BATTERIES, AND ELECTRODES AND BATTERIES USING SAME

BACKGROUND OF THE INVENTION

1. Field of the Invention

This invention relates to electrode materials for use in batteries, and electrodes and batteries using the same.

2. Description of the Related Art

In conventional polymer batteries, electrically conductive π-conjugated polymers formed by electrochemical or chemical polymerization have been used as electrode materials. For example, the use of polyacetylene for electrodes was reported in J. Chem. Soc. Chem. Commun., (1981) 317–319. Thereafter, extensive investigations on polyaniline, polypyrrole, polythiophene and the like have been carried out, and books for the explanation of batteries using electrically conductive polymers have already been published.

However, when an electrically conductive π-conjugated polymer alone is used, the resulting capacity is limited because of the reaction of 0.5 to 1 electron per monomeric unit.

Accordingly, in order to increase the capacity, it has been intended to fabricate a composite electrode by forming an electrically conductive π-conjugated polymer by electrochemical or chemical polymerization and then adding thereto a quinone compound which has poor electronic conductivity but can induce an oxidation-reduction reaction. For example, a composite electrode formed from polyaniline and benzoquinone has been reported in Synth. Met., 83 (1996) 89–96. In this composite electrodes, the proportion of a part contributing to a oxidation-reduction reaction per molecular weight is increased, resulting in an increased capacity. The reason for this is that, while the use of an electrically conductive π-conjugated polymer alone gives a low capacity because of the reaction of 0.5 to 1 electron per monomeric unit, the combined use of benzoquinone can add its oxidation-reduction capacity thereto. Moreover, the oxidation-reduction reaction of quinone proceeds rapidly as a result of interaction between the nitrogen atoms of polyaniline and benzoquinone, resulting in an enhanced power density.

However, batteries using such composite electrodes have the disadvantage that, as the number of charge-discharge cycles is increased, the quinone compound is eliminated to cause a decrease in capacity.

On the other hand, an electrode formed by adding an electrically conducting additive (e.g., carbon) to an unconjugated polymer having no electrical conductivity, such as an electrode using a polymer of benzoquinone as the unconjugated polymer, has been investigated. However, also with respect to batteries using such electrodes, it has been reported that, as the number of charge-discharge cycles is increased, the contact between the polymer and the electrically conducting additive is lost to cause a decrease in capacity.

SUMMARY OF THE INVENTION

It is an object of the present invention to provide batteries having excellent cycle characteristics and a high power density, as well as electrodes and electrode materials for use therein.

Accordingly, the present invention relates to an electrode material for use in batteries which comprises a polymer comprised of structural units having a basic structure derived from a nitrogen-containing compound and a quinone compound.

Moreover, the present invention relates to an electrode material for use in batteries which comprises a copolymer comprised of monomeric units having a basic structure derived from a nitrogen-containing compound and a quinone compound, and monomeric units forming a π-conjugated polymer.

Furthermore, the present invention relates to a battery electrode comprising one of the aforesaid electrode materials for use in batteries.

Moreover, the present invention relates to a battery using, as at least one electrode thereof, the battery electrode comprising one of the aforesaid electrode materials for use in batteries.

In the present invention, the nitrogen atom(s) of the nitrogen-containing compound and the active group of the quinone compound (hereinafter referred to as the "quinone active group") are present in the same molecule and, moreover, in the same structural units of the polymer. Thus, the oxidation-reduction reaction at the quinone site is efficiently accelerated to cause an enhancement in power density. This effect is suggested in Synth. Met., 83, 89 (1996), where it is reported that, on a composite electrode fabricated by synthesizing polyaniline by electrolytic polymerization and sweeping it in an aqueous solution of benzoquinone, the oxidation-reduction reaction of quinone proceeds rapidly as a result of interaction between the nitrogen atoms of polyaniline and the quinone.

Moreover, since the nitrogen-containing compound and the quinone active group are present in the same molecule, the battery can be repeatedly charged and discharged without eliminating the quinone active groups from the electrode, resulting in improved cycle characteristics.

Furthermore, as compared with the case in which molecules having a quinone active group and a polymer having nitrogen atoms are simply mixed together, the molecular weight required for the reaction of each electron is reduced because nitrogen atoms and quinone active groups are present in the same molecule. That is, the theoretical capacity is increased owing to the presence of nitrogen atoms and quinone active groups in the same molecule.

In addition, when the aforesaid polymer is copolymerized with a monomer forming an electrically conductive polymer, quinone active groups inherently having poor electronic conductivity, together with electrically active polymeric units, are present in the same molecule. Thus, the copolymer can retain electronic conductivity even if its contact with an electrically conducting additive is lost, resulting improved cycle characteristics.

DETAILED DESCRIPTION OF THE PREFERRED EMBODIMENTS

Figure 1:
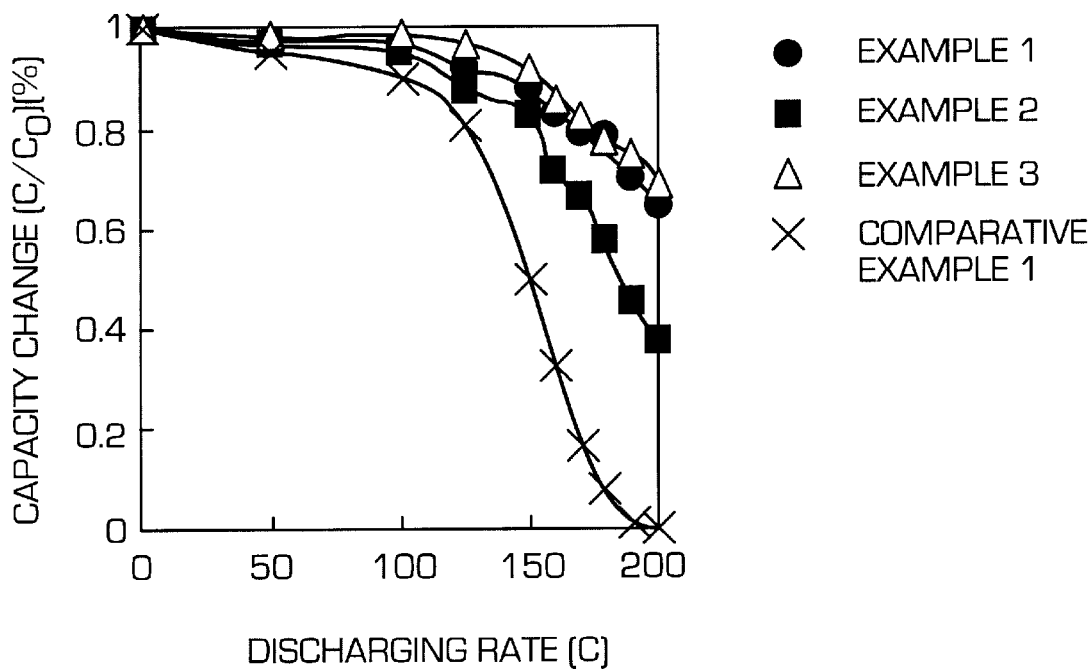
FIG. 1 is a graph showing capacity changes ($C/C_0$) relative to the capacity ($C_0$) observed at charging and discharging rates of 1C, when batteries constructed in several examples of the present invention and in a comparative example were charged at 1C and then discharged at varying discharging rates, after the charge-discharge cycle was repeated 5,000 times.

In the present invention, it is preferable that the aforesaid basic structure be a fused ring structure derived from a nitrogen-containing cyclic compound and a quinone compound. Moreover, it is also preferable that the monomeric units forming a π-conjugated polymer be units derived from an aniline compound. Furthermore, it is also preferable that the aforesaid nitrogen-containing cyclic compound be an aromatic amino compound or a nitrogen-containing heterocyclic compound.

Specific examples of the polymer used in the electrode material of the present invention are those represented by the following general formulae.

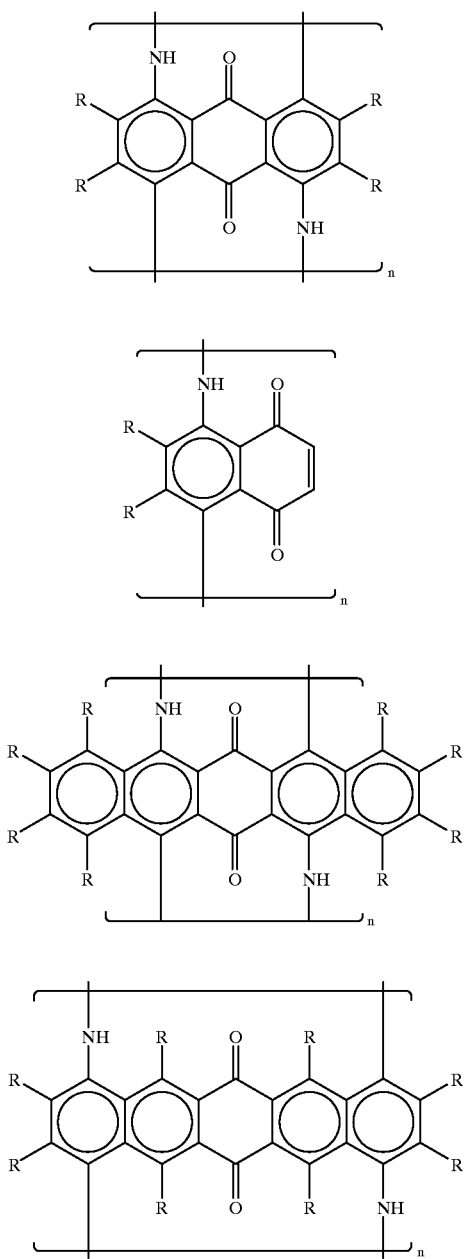

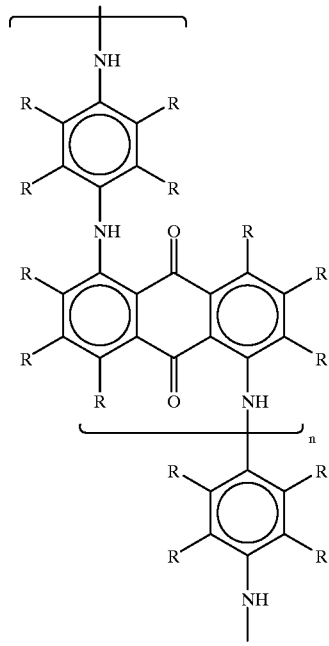

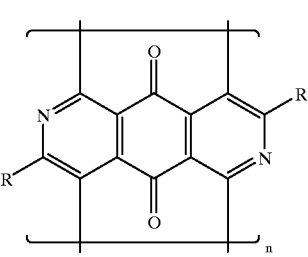

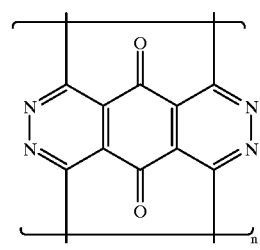

In these formulae, each R independently represents a hydrogen atom, a carboxyl group, a nitro group, a cyano group, a halogen atom (X), —$CX_3$, —$NHCOR^2$, —$OR^2$, a hydroxyl group, an amino group, —$N(R^2)_2$, a sulfonic acid group or the like, wherein $R^2$ is an alkyl group of 1 to 10 carbon atoms and preferably a methyl or ethyl group.

The above-described polymers may be prepared from the following monomers according to any of the well-known methods.

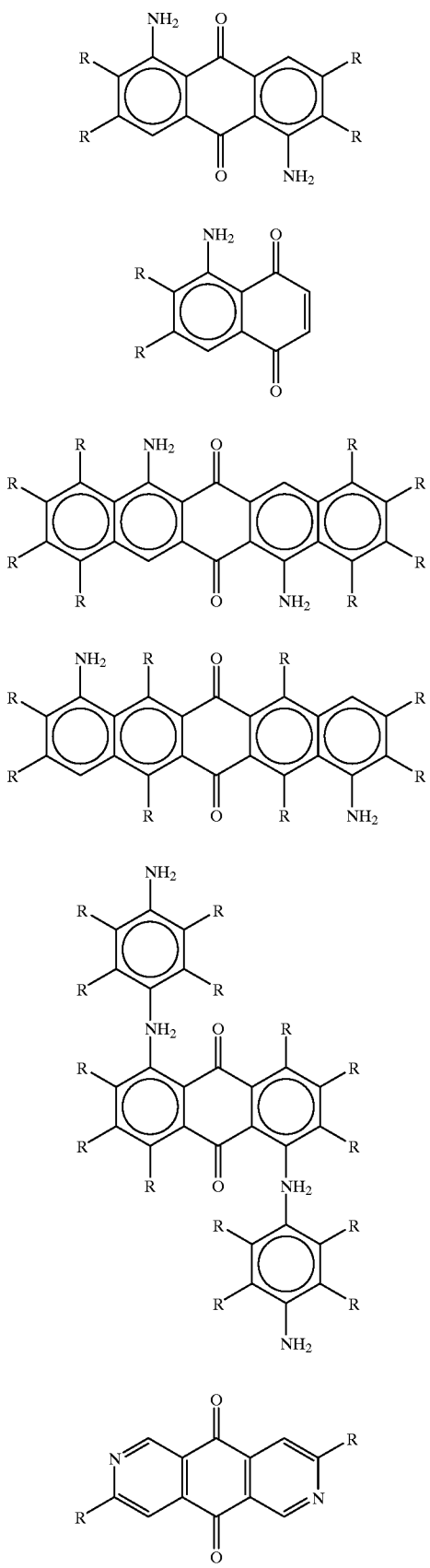

In these formulae, R corresponds to R in the above-described polymers.

The methods for polymerizing the foregoing monomers include, for example, a method in which a monomer as described above is dissolved in a solvent (water or an organic solvent such as acetonitrile, methanol, ethanol, propylene carbonate or γ-butyrolactone) with the aid of a proton acid (e.g., hydrochloric acid, sulfuric acid, perchloric acid, tetrafluoroboric acid or trifluoroacetic acid) and electrochemically polymerized, and a method in which a monomer as described above is chemically polymerized in an acid solution with the aid of an oxidizing agent such as ammonium persulfate or iron trichloride.

The polymer prepared according to any of the above-described methods is mixed with an electrically conducting additive comprising carbon powder, and a solution of a binder such as polyvinylidene fluoride. Then, a battery electrode is fabricated by depositing the resulting slurry on a current collector so as to form a film.

The electrode thus obtained is used as at least one of the positive and negative electrodes.

As the electrolytic solution, there is used an aqueous solution of a proton acid or a nonaqueous solution having a proton source added thereto. Finally, a battery is constructed by arranging the positive and negative electrodes in opposed relationship with a separator interposed therebetween.

The present invention is further illustrated by the following examples. However, these examples are not to be construed to limit the scope of the invention.

EXAMPLE 1

0.01M 1,5-diaminoanthraquinone [i.e., the compound of formula (8) in which R is H] was added to a propylene carbonate (hereinafter abbreviated as "PC") solution containing 0.5M tetraethylammonium perchlorate, and dissolved therein by stirring the mixture.

After 0.5M trifluoroacetic acid serving as a proton acid was added to the above solution, sweep polymerization was carried out on a gold electrode by using a sweep range of 0 to 1,500 mV, a sweep rate of 100 mv/s, and a counter electrode comprising a platinum wire. The resulting polymer was thoroughly washed with distilled water, washed with ethanol, and dried at 30° C. and 10 Torr for 6 hours.

In a mortar, 0.5 mg of the resulting polymer (polydiaminoanthraquinone) was mixed with 0.5 mg of carbon powder. After this powder mixture was dispersed in N,N-dimethylformamide (hereinafter abbreviated as "DMF"), a solution of polyvinylidene fluoride (hereinafter abbreviated as "PVDF") in DMF was added thereto in an amount equivalent to 15% by weight and mixed therewith to form a slurry.

Using a doctor blade, the resulting slurry was spread on an electrically conductive sheet (made of a styrene-ethylene block copolymer having carbon powder dispersed therein)

so as to form a film. This film was dried at 120° C. for 1 hour to obtain a battery electrode. The film thickness of this electrode was 50 microns.

The electrode thus obtained was used as the positive electrode. On the other hand, using polydimethoxyaniline doped with polyvinylsulfonic acid (hereinafter abbreviated as "PVSA") in place of polydiaminoanthraquinone, an electrode was fabricated in the above-described manner and used as the negative electrode. Then, a battery was constructed by using these electrodes, an electrolytic solution comprising a 6M PVSA solution, and a separator comprising a porous polypropylene sheet.

In order to examine its cycle characteristics, the battery so constructed was evaluated by charging and discharging it at IC and measuring the initial capacity ($C_0$) and the discharge capacity ($C_{5000}$) after the charge-discharge cycle was repeated 5,000 times. Moreover, in order to examine its power density, the above battery was charged at 1C and then discharged at varying discharging rates ranging from 10C to 200C. Thus, capacity changes relative to the capacity observed at charging and discharging rates of 1C were measured. Table 1 shows the $C_{5000}/C_0$ ratio and the discharging rate at which the capacity decreased by more than 20% when the capacity observed at charging and discharging rates of 1C was taken at 100%. FIG. 1 shows capacity changes ($C/C_0$) relative to the capacity ($C_0$) observed at charging and discharging rates of 1C, when batteries constructed in several examples of the present invention and in a comparative example were charged at 1C and then discharged at varying discharging rates, after the charge-discharge cycle was repeated 5,000 times.

EXAMPLE 2

0.01M 1,5-diaminoanthraquinone [i.e., the compound of formula (8) in which R is H] was added to a γ-butyrolactone solution containing 0.5M tetraethylammonium perchlorate, and dissolved therein by stirring the mixture.

A γ-butyrolactone solution of iron toluenesulfonate serving as an oxidizing agent was added to the above solution, and the resulting mixture was stirred to yield a polymer. This polymer was separated by suction filtration, thoroughly washed with distilled water, washed with ethanol, and dried at 30° C. and 10 Torr for 6 hours.

Using the polymer thus obtained, an electrode was fabricated in the same manner as in Example 1. Then, a battery was constructed by using this electrode in combination with a counter electrode comprising polydimethoxyaniline, and evaluated in the same manner as in Example 1.

EXAMPLE 3

0.01M 1,5-diaminoanthraquinone and 0.01M aniline were added to a propylene carbonate solution containing 0.5M tetraethylammonium perchlorate, and dissolved therein by stirring the mixture.

After 0.5M trifluoroacetic acid serving as a proton acid was added to the above solution, sweep polymerization was carried out on a gold electrode by using a sweep range of 0 to 1,500 mV, a sweep rate of 100 mV/s, and a counter electrode comprising a platinum wire. The resulting copolymer was thoroughly washed with distilled water, washed with ethanol, and dried at 30° C. and 10 Torr for 6 hours.

Using the copolymer thus obtained, an electrode was fabricated in the same manner as in Example 1. Then, a battery was constructed by using this electrode in combination with a counter electrode comprising polydimethoxyaniline, and evaluated in the same manner as in Example 1.

EXAMPLE 4

The same electrodes as used in the same manner as in Example 1 were fabricated. Then, a battery was constructed by using these electrodes in combination with an electrolytic solution comprising a PC solution containing 1M trifluoroacetic acid, and evaluated in the same manner as in Example 1.

COMPARATIVE EXAMPLE 1

Polyaniline powder obtained by chemical polymerization was doped with PVSA by stirring it in a PVSA solution at 70° C. for 6 hours. The resulting polyaniline was thoroughly washed with distilled water, washed with ethanol, and dried at 30° C. and 10 Torr for 6 hours.

In a mortar, the PVSA-doped polyaniline thus obtained and benzoquinone were intimately mixed in a molar ratio of 1:1. Using this powder mixture, an electrode was fabricated in the same manner as in Example 1. Then, a battery was constructed by using this electrode in combination with a counter electrode comprising polydimethoxyaniline, and evaluated in the same manner as in Example 1.

COMPARATIVE EXAMPLE 2

The same electrodes as used in the same manner as in Comparative Example 1 were fabricated. Then, a battery was constructed by using these electrodes in combination with an electrolytic solution comprising a PC solution containing 1M trifluoroacetic acid, and evaluated in the same manner as in Example 1.

TABLE 1

| | Positive electrode (polymerization method) | Negative electrode | Electrolytic solution | Capacity change ($c_{5000}/c_0$) | Discharging rate |
|---|---|---|---|---|---|
| Example 1 | Polydiaminoanthraquinone (electrolytic polymerization) | Polydimethoxyaniline | 6M PVSA in water | 0.75 | 170 c |
| Example 2 | Polydiaminoanthraquinone (chemical polymerization) | Polydimethoxyaniline | 6M PVSA in water | 0.75 | 150 c |
| Example 3 | diaminoanthraquinone/ aniline copolymer (electrolytic polymerization) | Polydimethoxyaniline | 6M PVSA in water | 0.85 | 160 c |
| Comparative Example 1 | Polyaniline (chemical polymerization) + benzoquinone | Polydimethoxyaniline | 6M PVSA in water | 0.20 | 120 c |
| Example 4 | Polydiaminoanthraquinone (electrolytic polymerization) | Polydimethoxyaniline | 1M trifluoroacetic acid in PC | 0.75 | 20 c |
| Comparative Example 2 | Polyaniline (chemical polymerization) + benzoquinone | Polydimethoxyaniline | 1M trifluoroacetic acid in PC | 0.15 | 10 c |

It can be seen from the results shown in Table 1 that, with respect to both the nonaqueous and the aqueous electrolytic solution, the discharging rate at which the capacity decreased by more than 20% was higher in the examples than in the comparative examples. That is, it can be seen that the batteries constructed in accordance with the present invention can be discharged at higher currents and hence have a high power density.

This effect of the present invention is believed to be due to the fact that the migration of protons occurs in the molecule owing to the interaction between the nitrogen atoms of the nitrogen-containing compound and the quinone as represented by the following formulae, and this activates the oxidation-reduction reaction of the quinone and causes it to proceed rapidly. Formula (15) shows the manner in which a hydrogen atom attached to the nitrogen atom of an amino group migrates as a proton and binds to an oxygen atom of the quinone. Formula (16) shows the manner in which H$^+$ in the vicinity of a nitrogen atom quaternized in a solution of a proton acid (H$^+$X$^-$) migrates and binds to an oxygen atom of the quinone. Thus, it is believed that the migration of protons in the molecule enables the reaction of the quinone to proceed smoothly.

polyaniline molecule in the vicinity thereof, so that some benzoquinone is not activated. On the other hand, in the examples, nitrogen atoms and quinone active groups are originally present in the same molecule and, moreover, in the same structural units of the polymer. Consequently, all quinone active groups can interact with nitrogen atoms. The interaction between nitrogen atoms and quinone active groups causes the oxidation-reduction reaction of the quinone to proceed rapidly, so that a high capacity can be achieved even at high discharging rates. This brings about an improvement in the power density of the battery.

In Examples 1 and 2, the capacity per unit weight of the positive electrode comprising polydiaminoanthraquinone is 140 Ah/kg. On the other hand, in Comparative Example 1, the capacity per unit weight of the positive electrode comprising polyaniline and benzoquinone is 80 Ah/kg. In addition to the above-described fact the interaction between all quinone active groups and nitrogen atoms is possible in polydiaminoanthraquinone, this is also believed to be due to the fact that the molecular weight required for the reaction of each electron is decreased owing to the presence of nitrogen atoms and quinone active groups in the same

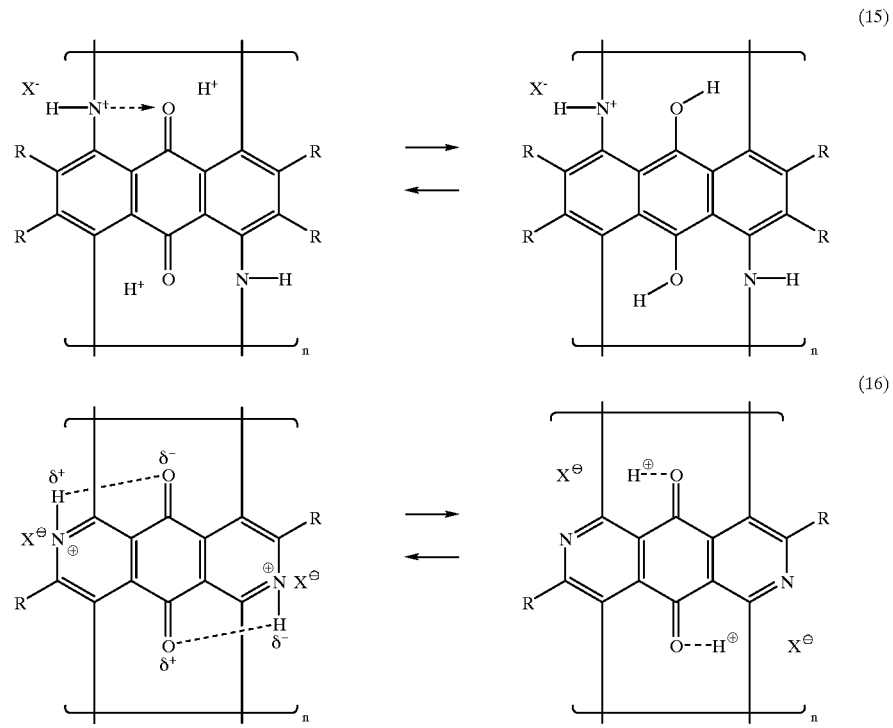

In the comparative examples, polyaniline is formed and then mixed with benzoquinone. For this reason, it is impossible to mix them on a molecular level where all benzoquinone interacts with the nitrogen atoms of polyaniline. Consequently, it is thought that there is some inactive benzoquinone which does not interact with the nitrogen atoms of polyaniline. That is, in the comparative examples, there is a certain proportion of benzoquinone having no molecule, i.e., the number of reacting electrons per molecular weight is increased to cause an increase in theoretical capacity. When PVSA is used as a dopant, the theoretical capacity of polydiaminoanthraquinone used in Examples 1 and 2 is 243 Ah/kg [see formula (17)], whereas the theoretical capacity of the mixture of polyaniline and benzoquinone used in Comparative Example 1 is 203 Ah/kg [see formula (18)].

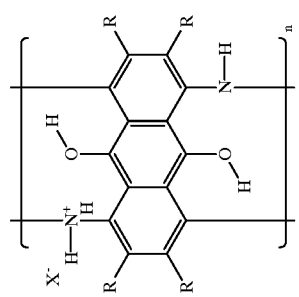
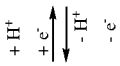
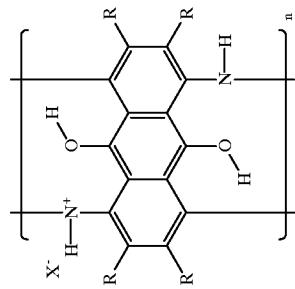
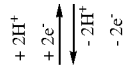
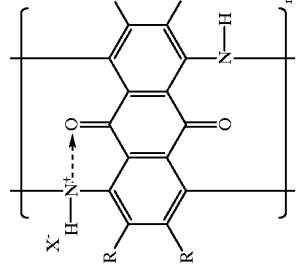
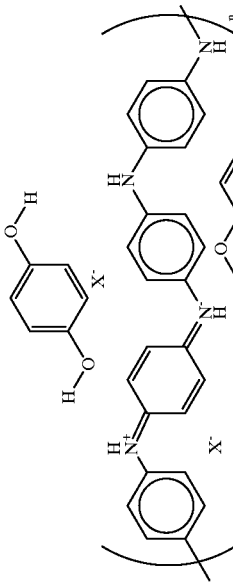
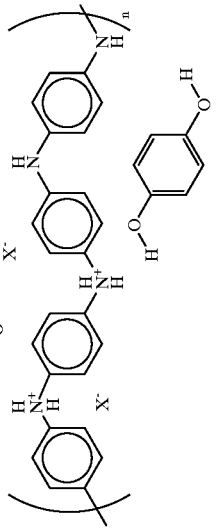
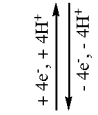
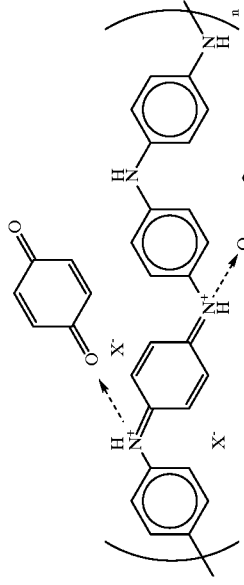

Moreover, a reduction in cycle characteristics due to the elimination of benzoquinone is noted. In the examples, however, the quinone active groups are not eliminated from the electrode because the nitrogen atoms of the nitrogen-containing compound and the quinone active groups are present in the same molecular chain and, moreover, in the same structural units. Consequently, the batteries can be repeatedly charged and discharged, resulting in a marked improvement in cycle characteristics.

Furthermore, in Example 3, a copolymer was formed from diaminoanthraquinone and aniline constituting polyaniline that is an electrically conductive π-conjugated polymer having electronic conductivity. Since quinone compounds inherently have poor electronic conductivity, they require the addition of an electrically conducting additive (e.g., carbon powder) when used for battery electrodes. For example, when carbon or the like is added as an electrically conducting additive, one cause for the deterioration of cycle characteristics is the fact that the contact with the electrically conducting additive is lost owing to the volumetric changes of the quinone compound material which accompany the addition and elimination of protons during charging and discharging. However, in Example 3 where electrically conductive polymeric units and quinone active groups are present in the same molecule, the copolymer can retain electronic conductivity even if its contact with an electrically conducting additive is lost. Consequently, the battery of Example 3 shows an improvement in cycle characteristics as compared with those of Examples 1 and 2.

What is claimed is:

1. An electrode material for use in batteries which comprises a polymer comprised of structural units having a basic structure wherein said basic structure is a fused ring structure derived from a nitrogen-containing cyclic compound and a quinone compound represented by one of the following formulae:

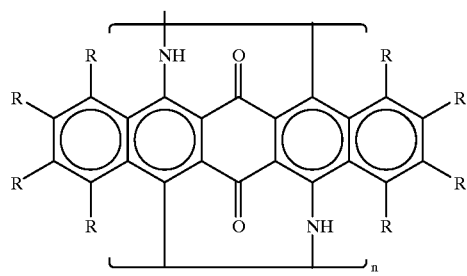

(1)

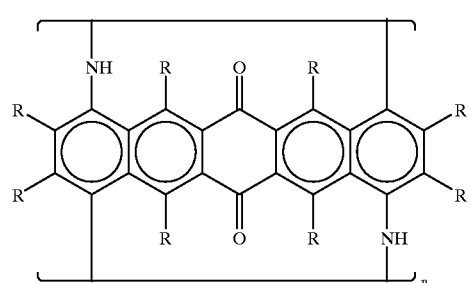

(2)

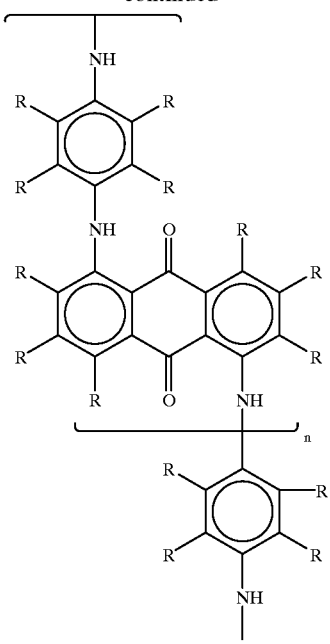

(3)

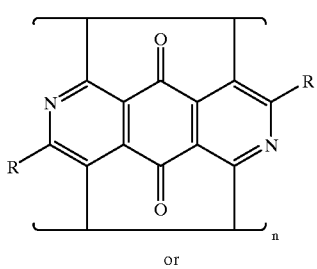

(4)

or

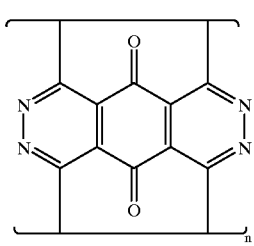

(5)

wherein each R independently represents a hydrogen atom, a carboxyl group, a nitro group, a cyano group, a halogen atom (X), —CX$_3$, —NHCOR$^2$, —OR$^2$, a hydroxyl group, an amino group, —N(R$^2$)$_{21}$ or a sulfonic acid group, wherein R$^2$ is an alkyl group of 1 to carbon atoms;

and an electrically conducting additive.

2. An electrode material for use in batteries as claimed in claim 1 wherein the nitrogen-containing cyclic compound is an aromatic amino compound.

3. An electrode material for use in batteries as claimed in claim 1 wherein the nitrogen-containing cyclic compound is a nitrogen-containing heterocyclic compound.

4. A battery electrode comprising the electrode material of claim 1.

5. A battery comprising an electrode comprising the electrode material of claim 1.

6. An electrode material for use in batteries which comprises a copolymer comprised of monomeric units having a basic structure wherein said basic structure is a fused ring structure derived from a nitrogen-containing cyclic compound and a quinone compound, and monomeric units forming a π-conjugated polymer;

wherein the quinone compound is represented by one of the following formulae:

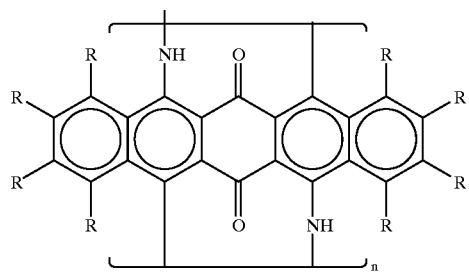

(1)

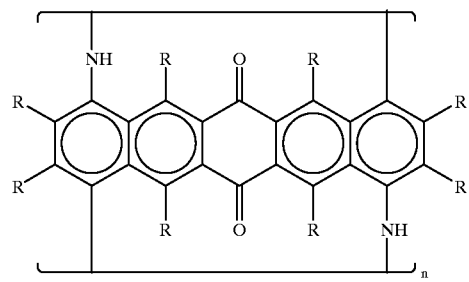

(2)

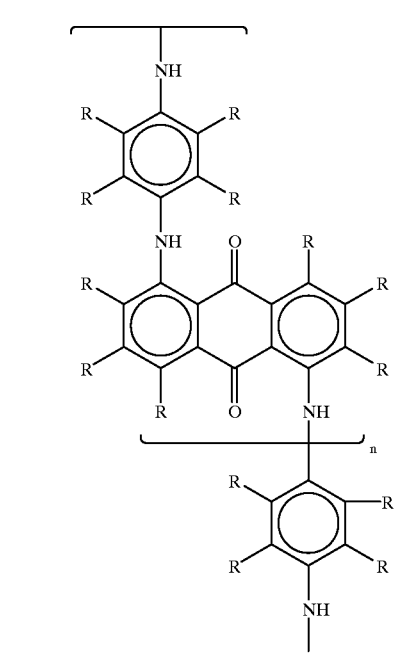

(3)

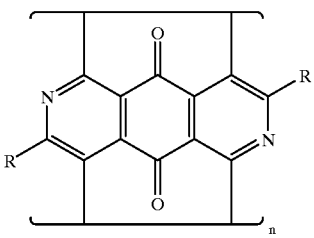

(4)

or

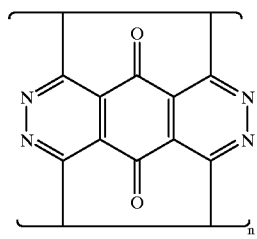

(5)

wherein each R independently represents a hydrogen atom, a carboxyl group, a nitro group, a cyano group, a halogen atom (X), —$CX_3$, —$NHCOR^2$, $OR^2$, a hydroxyl group, an amino group, —$N(R^2)_2$, or a sulfonic acid group, wherein $R^2$ is an alkyl group of 1 to 10 carbon atoms.

7. An electrode material for use in batteries as claimed in claim 6 wherein the nitrogen-containing cyclic compound is an aromatic amino compound.

8. An electrode material for use in batteries as claimed in claim 6 wherein the nitrogen-containing cyclic compound is a nitrogen-containing heterocyclic compound.

9. An electrode material for use in batteries as claimed in claim 6 wherein the monomeric units forming a π-conjugated polymer are units derived from an aniline compound.

10. A battery electrode comprising the electrode material of claim 6.

11. A battery using a battery electrode comprising the material of claim 6 as at least one electrode thereof.

* * * * *